(12) United States Patent
Reimann

(10) Patent No.: US 12,003,960 B2
(45) Date of Patent: **\*Jun. 4, 2024**

(54) BOOTING AND OPERATING COMPUTING DEVICES AT DESIGNATED LOCATIONS

(71) Applicant: Red Hat, Inc., Raleigh, NC (US)

(72) Inventor: Jens Reimann, Grasbrunn (DE)

(73) Assignee: Red Hat, Inc., Raleigh, NC (US)

(\*) Notice: Subject to any disclaimer, the term of this patent is extended or adjusted under 35 U.S.C. 154(b) by 285 days.

This patent is subject to a terminal disclaimer.

(21) Appl. No.: 17/397,944

(22) Filed: Aug. 9, 2021

(65) Prior Publication Data

US 2021/0368340 A1 Nov. 25, 2021

Related U.S. Application Data

(63) Continuation of application No. 16/181,998, filed on Nov. 6, 2018, now Pat. No. 11,089,475.

(51) Int. Cl.
*H04W 12/06* (2021.01)
*G06F 21/57* (2013.01)
*H04L 9/14* (2006.01)
*H04W 12/04* (2021.01)
*H04W 12/63* (2021.01)

(52) U.S. Cl.
CPC .......... *H04W 12/06* (2013.01); *G06F 21/575* (2013.01); *H04L 9/14* (2013.01); *H04W 12/04* (2013.01); *H04W 12/63* (2021.01); *G06F 2221/031* (2013.01); *H04L 2209/805* (2013.01)

(58) Field of Classification Search
CPC .................. G06F 21/16; G06F 16/285; G06F 2221/0737; G06N 3/08

USPC ........................................................ 713/171
See application file for complete search history.

(56) References Cited

U.S. PATENT DOCUMENTS

| | | | | |
|---|---|---|---|---|
| 7,093,296 | B2* | 8/2006 | Nusser | G06F 21/10 |
| | | | | 726/26 |
| 7,580,701 | B2* | 8/2009 | Ross | H04L 63/104 |
| | | | | 455/411 |
| 7,930,764 | B2* | 4/2011 | Hug | G06F 21/10 |
| | | | | 726/29 |
| 8,031,874 | B2* | 10/2011 | Park | H04L 63/0892 |
| | | | | 380/270 |
| 8,176,323 | B2* | 5/2012 | Anemikos | H04L 9/32 |
| | | | | 713/168 |

(Continued)

*Primary Examiner* — Badri Narayanan Champakesan
(74) *Attorney, Agent, or Firm* — Dority & Manning, P.A.

(57) ABSTRACT

Aspects of the disclosure provide for mechanisms for booting and operating a computing device at a target location. A method of the disclosure includes determining, at a startup process of a computing device, whether the computing device is present at a designated target location by checking, using a first near-field communication (NFC) device associated with the computing device, presence of a second NFC device positioned at the target location. The method further includes in response to detecting the presence of the second NFC device, acquiring a cryptographic key from the second NFC device. The method also includes decrypting contents associated with the computing device using the cryptographic key, and performing, using the decrypted contents, a boot process for the computing device in response to determining that the computing device is at the target location.

19 Claims, 9 Drawing Sheets

(56) References Cited

U.S. PATENT DOCUMENTS

| | | | | |
|---|---|---|---|---|
| 8,312,559 B2* | 11/2012 | Walrath | H04W 12/065 | 726/36 |
| 8,347,349 B1* | 1/2013 | Wilson | G06F 21/6218 | 713/193 |
| 8,468,591 B2* | 6/2013 | Silverstone | G06F 21/554 | |
| 8,607,315 B2* | 12/2013 | Jou | H04W 12/08 | 726/4 |
| 8,627,432 B2* | 1/2014 | Dachiraju | H04N 21/4316 | 705/52 |
| 8,813,246 B2* | 8/2014 | Hierro | G06F 21/10 | 713/165 |
| 8,832,811 B2* | 9/2014 | Horman | G06F 21/31 | 726/7 |
| 8,832,852 B2* | 9/2014 | Raley | H04L 67/63 | 380/258 |
| 8,918,632 B1* | 12/2014 | Sartor | H04L 63/1483 | 713/1 |
| 8,924,592 B2* | 12/2014 | Jakubowski | H04L 67/02 | 709/248 |
| 8,989,706 B2* | 3/2015 | Ananthanarayanan | H04W 12/50 | 455/411 |
| 9,202,059 B2* | 12/2015 | Bhansali | G06F 9/4406 | |
| 9,210,192 B1* | 12/2015 | Kim | H04W 12/06 | |
| 9,239,920 B2* | 1/2016 | Ashkenazi | G06F 21/51 | |
| 9,323,901 B1* | 4/2016 | Nair | G06F 21/10 | |
| 9,390,248 B2* | 7/2016 | Halibard | G06F 21/575 | |
| 9,400,895 B2* | 7/2016 | Dadu | G06F 21/88 | |
| 9,445,267 B1* | 9/2016 | Varoglu | H04W 12/069 | |
| 9,635,014 B2* | 4/2017 | Venkataraman | H04L 9/0863 | |
| 10,002,236 B2* | 6/2018 | Fasoli | H04W 4/60 | |
| 10,387,689 B2* | 8/2019 | Krawczewicz | H04L 9/0822 | |
| 10,420,879 B2* | 9/2019 | Heck | A61B 5/14532 | |
| 10,469,887 B2* | 11/2019 | Smith | H04N 21/4627 | |
| 10,552,614 B2* | 2/2020 | Nguyen | H04W 12/06 | |
| 10,616,075 B2* | 4/2020 | Dawes | H04L 67/125 | |
| 2002/0115426 A1* | 8/2002 | Olson | H04W 12/06 | 455/410 |
| 2006/0236120 A1* | 10/2006 | Jones | H04K 1/00 | 713/186 |
| 2006/0288082 A1* | 12/2006 | Rosenberg | G06Q 30/0241 | 709/217 |
| 2007/0156601 A1* | 7/2007 | Brew | 705/57 | |
| 2007/0169189 A1* | 7/2007 | Crespo | H04L 67/02 | 726/20 |
| 2007/0180255 A1* | 8/2007 | Hanada | G06F 21/31 | 713/176 |
| 2010/0058485 A1* | 3/2010 | Gonzalez | G06F 21/10 | 726/27 |
| 2014/0082133 A1* | 3/2014 | Dolph | H04L 63/0428 | 709/217 |
| 2014/0189778 A1* | 7/2014 | Li | G06F 21/554 | 726/1 |
| 2014/0196142 A1* | 7/2014 | Louboutin | G06F 21/44 | 726/16 |
| 2014/0257591 A1* | 9/2014 | Cheng | G06F 1/20 | 700/300 |
| 2015/0020153 A1* | 1/2015 | Jang | H04L 63/12 | 726/1 |
| 2015/0029532 A1* | 1/2015 | Lee | H04W 12/068 | 358/1.14 |
| 2015/0220881 A1* | 8/2015 | Geisert | G06Q 10/10 | 705/59 |
| 2015/0222633 A1* | 8/2015 | Smith | H04L 63/10 | 726/29 |
| 2016/0224764 A1* | 8/2016 | Pathak | G06F 16/93 | |
| 2017/0139915 A1* | 5/2017 | Dauderman | G06F 16/447 | |
| 2017/0257761 A1* | 9/2017 | Rodriguez | H04L 63/061 | |
| 2017/0262619 A1* | 9/2017 | Taneja | G06F 21/10 | |
| 2017/0371519 A1* | 12/2017 | Beveridge | G06F 9/45558 | |
| 2017/0374431 A1* | 12/2017 | Ryan | H04N 21/4122 | |
| 2018/0107805 A1* | 4/2018 | Anantharaman | G06F 3/011 | |
| 2018/0152443 A1* | 5/2018 | Henrique Minatel | H04W 76/10 | |
| 2018/0279002 A1* | 9/2018 | Cugi | H04N 21/4627 | |
| 2018/0309762 A1* | 10/2018 | Hussain | H04L 63/0281 | |
| 2020/0053094 A1* | 2/2020 | Kaube | H04L 63/105 | |

* cited by examiner

BOOTING AND OPERATING COMPUTING DEVICES AT DESIGNATED LOCATIONS

RELATED APPLICATIONS

This application is a continuation application of co-pending U.S. patent application Ser. No. 16/181,998, filed Nov. 6, 2018, which is herein incorporated by reference.

TECHNICAL FIELD

The implementations of the disclosure generally relate to computer systems and, more specifically, to booting and operating computing devices at designated locations.

BACKGROUND

To implement edge computing, such as the Internet of Things or "IoT" applications, a computer is typically provisioned in a central location and then shipped to a target location for assembly (e.g., to be mounted into a switchboard, control cabinet, etc.). The computer may be a small form factor computer that is designed to minimize the volume and footprint of a desktop computer. Edge computing may enable implementations of a distributed computing paradigm in which computation is mainly performed on distributed devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
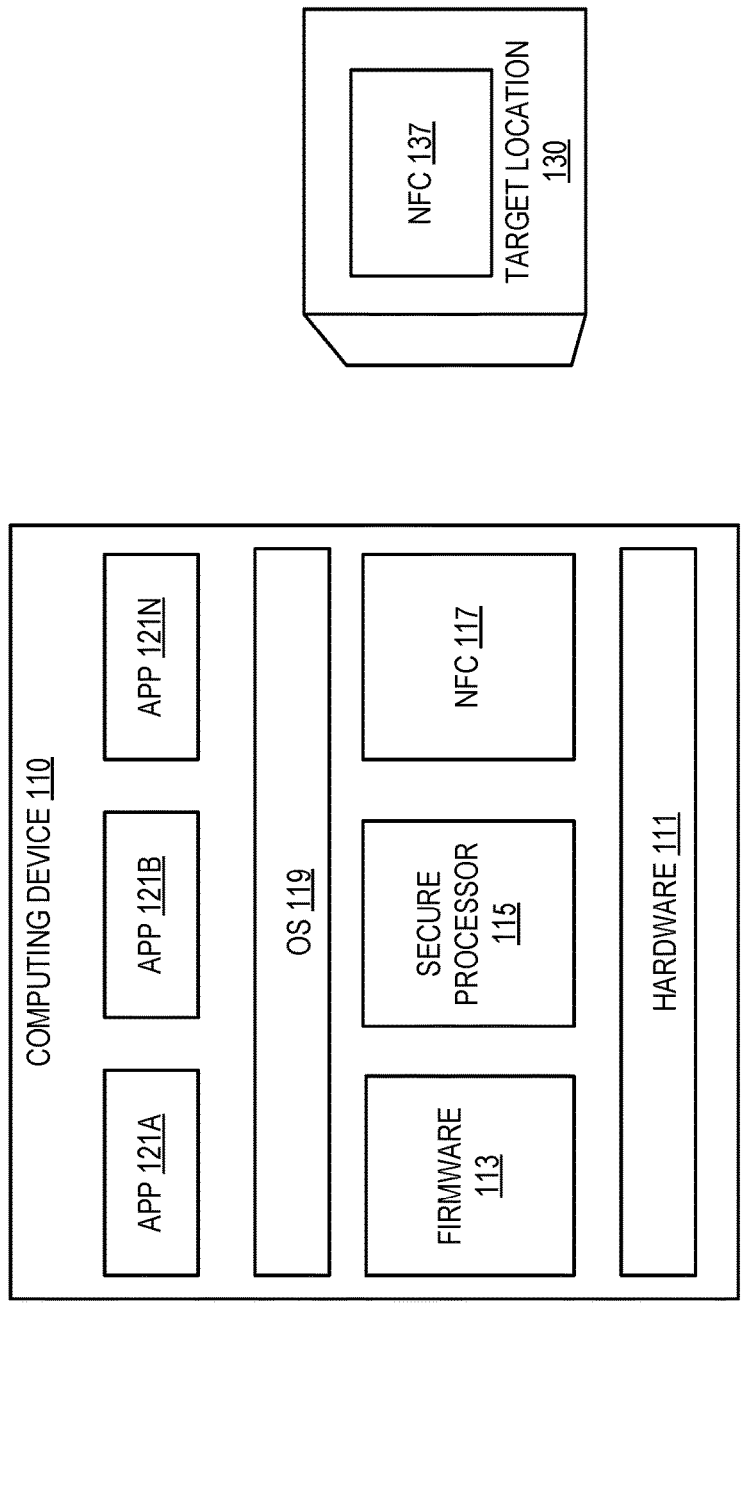
FIG. 1 is a block diagram of a network architecture in which implementations of the disclosure may operate.

Certain computing devices may be designated to operate at a specific target location. For example, to implement edge computing, such as the Internet of Things or "IoT" applications, a computer (e.g., a small form factor computer) is typically provisioned in a central location and then shipped to a target location for assembly (e.g., to be mounted into a switchboard, control cabinet, etc.). The computer then operates at the target location. As a more specific example, an IoT gateway device may be provisioned at a first location and may be installed at a second location (the target location). The IoT gateway device is designated to operate at the target location and is not supposed to be moved from the target location.

Prior computing techniques typically do not provide a solution for booting and operating computing devices at a target location in a secure manner. For example, after being provisioned at the central location, the hardware and/or software of a computer may be compromised before its assembly at the target location. The computer may also be removed from the target location without the knowledge of an administrator of the computer and be operated at a different location without permission.

Aspects of the present disclosure address the above and other deficiencies by providing techniques for booting and operating a computing device at a target location at which the computing device is designated to operate. In some embodiments, a firmware of the computing device may determine whether the computing device is at the target location before booting the computing device. The firmware of the computing device may boot the computing device in response to determining that the computing device is located at the target location (e.g., being within a predetermined proximity of the target location). The firmware of the computing device does not boot the computing device when the computing device is not within the predetermined proximity of the target location. In some embodiments, the firmware of the computing device may determine whether the computing device is in a predetermined proximity (e.g., a few centimeters) of the target location using a near-field communication (NFC) device of the computing device (also referred to as the "first NFC device"). The firmware of the computing device may determine that the computing device is at the target location in response to detecting presence of an NFC device positioned at the target location (also referred to as the "second NFC device") using the first NFC device. The first NFC device may further authenticate the second NFC device to confirm that the second NFC device is an authenticated device positioned at the target location. The second NFC device may be positioned at the target location in a way that removing the second NFC device from the target location destroys the second NFC device. For example, the second NFC may be built into a control cabinet at the target location. As such, the firmware of the computing device can boot the computing device on the condition that the computing device is at the target location.

As used herein, "firmware" may refer to software provided to a virtual machine by a host machine (e.g., by a hypervisor of the host machine, a hardware component of the host machine, etc.) and may include any of firmware, software, hardware, or a combination thereof.

In some embodiments, the first NFC device may check the presence of the second NFC continuously (e.g., periodically) after the computing device is booted. In response to detecting absence of the second NFC device, the first NFC device may generate a signal indicating the absence of the second NFC device. The firmware of the computing device may then shut down the computing device in view of the signal. Accordingly, the computing device does not operate when the computing device is not at the target location (e.g., not within the predetermine proximity of the target location and/or the second NFC device).

In some embodiments, the second NFC device may store secret data that can be used to boot and/or operate the computing device. The secret data may include, for example, a cryptographic key that can be used to decrypt a storage device of the computing device (e.g., a memory). The firmware may acquire the secret data from the second NFC device (e.g., via a communication link between the first NFC device and the second NFC device). The firmware can then boot the computing device using the secret data. For example, the firmware may access the storage device using the cryptographic key and may load an operating system of the computing device to the storage device to boot the computing device.

The systems and methods described herein include technology that enhances security for a computer system. The technology may enable booting and operating a computing device at a designated target location and may prevent operation of the computing device at a location that is different from the designated target location. Compared to conventional computing techniques, the mechanisms disclosed herein may ensure that the computing device does not boot or operate when the computing device is not located at the target location. This may allow the mechanisms to boot and operate the computing device on the condition that the computing device is located at the target location, resulting in improved computing security. Moreover, by storing secret data to be used to boot the computing device in an NFC device secured at the target location, the mechanisms disclosed herein may further improve storage security and integrity of the computing device.

FIG. 1 is a block diagram of an example of a computer system 100 according to some embodiments of the present disclosure. The computer system 100 may include a computing device 110 which may be a server, a workstation, a personal computer (PC), a mobile phone, a palm-sized computing device, a personal digital assistant (PDA), a gaming console, a home media center, etc. "Computer system" and/or "computing device" as used herein may be and/or include a system comprising one or more processors, one or more memory devices, and one or more input/output (I/O) interfaces.

As illustrated, computing device 110 may include hardware 111, such as one or more processors (e.g., central processing units (CPUs)), I/O devices, network adapters, display devices, memory, and/or any other hardware component. Local connections within computer system 100, including connections between processors and memory devices 160, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The computing device 110 may further include firmware 113 that can interface with the hardware 111 (e.g., sending commands to the hardware and receiving signals from the hardware). The firmware can perform hardware initialization during a boot process, provide runtime services for an operating system 119 of the computing device 110 and/or programs running on the computing device 110, etc. The firmware may be, for example, BIOS (Basic Input/Output System), UEFI (United Extensible Firmware Interface), etc.

The computing device 110 may also include a near-field communication (NFC) device 117. As used herein, a NFC device may be any device that is capable of implementing an NFC protocol which enables computing devices to establish communication when they are within a certain distance from each other (e.g., 4 centimeters). Examples of the NFC device may include an NFC tag, an NFC reader, an NFC-enabled mobile phone, etc. The NFC device 117 can search for nearby NFC devices (e.g., by sending a signal periodically) and may communicate with the NFC devices, such as an NFC device 137. The NFC device 137 may be positioned at a target location 130. The target location 130 may be any location at which the computing device is designated to operate. The NFC device 137 may be positioned in the target location 130 in a way that removing the NFC device 137 from the target location 130 destroys the NFC device 137. For example, the NFC device 137 may be built into a control cabinet located at the target location. As another example, the NFC device 137 may be attached to the target location using a sticker or any other suitable mechanism so that removing the NFC device 137 from the target location may destroy the NFC device 137.

The NFC device 137 may store data that may be used to authenticate the NFC device 137 and/or to perform a boot process for the computing device 110. For example, the NFC device 137 may store credential information that may be used to authenticate the NFC device 137. The credential information may include, for example, a unique identifier that can be used to identify the NFC device 137, a password, etc. As another example, the NFC device 137 can store one or more cryptographic keys that can be used to boot and/or operate the computing device 110. The cryptographic keys may include, for example, a decryption key that can be used to decrypt a storage device (e.g., an encrypted disk) of the computing device 110.

In some embodiments, when the NFC device 117 is in a predetermined proximity of the NFC device 137 (e.g., a few centimeters), the NFC device 117 may detect the presence of the NFC device 137. In one implementation, the NFC device 117 may determine that a device identifier of the NFC device 137 matches an identifier of an authenticated NFC device. In another implementation, the NFC device 117 may perform a handshaking process with the NFC device 137 to authenticate the NFC device 137. For example, the NFC device 117 may transmit one or more messages to initiate communication and/or to establish a communication link with a nearby NFC device. Upon receiving the messages, the NFC device 137 may transmit one or more messages to the NFC device 117 to establish a communication link with the NFC device 117. The NFC device 117 and the NFC device 137 may exchange credential information (e.g., identifiers, signatures, keys, etc.) during the handshaking process to establish the communication link.

Upon detecting the presence of the NFC device 137, the firmware 113 may perform a validation process to authenticate the NFC device 137. For example, the firmware 113 may receive, via the NFC device 117, the credential information stored in the NFC device 137. The firmware 113 can perform the validation process using the credential information. In some embodiments, the firmware 113 may compare the received credential information with known credential information of an authenticated NFC device (e.g., an NFC device located at the target device) to determine whether the received credential information matches the known credential information. The valid credential information may be stored in a memory associated with the firmware 113. The firmware 113 may determine that the NFC device 137 is a valid device in response to determining that the credential information provided by the NFC device 137 matches the known credential information. Alternatively, the firmware 113 may determine that the NFC device 137 is not a valid device in response to determining that the credential information provided by the NFC device 137 does not match the known credential information. In some embodiments, the validation process may be performed using a challenge-response authentication method. For example, the firmware 113 may issue a first message representing a challenge (e.g., via the NFC device 117). The NFC device 137 may respond to the challenge by sending a second message to the firmware 113. The second message may include a response to the challenge (e.g., the credential information stored in the NFC device 137). The firmware 113 may then determine whether the received response is a correct response (e.g., the known credential information) to determine whether the NFC device 137 is a valid device.

In some embodiments, in response to determining that the NFC device 137 is not a valid device, the firmware 113 may shut down the computing device 110 and/or may refrain from booting the computing device 110. Alternatively, in response to determining that the NFC device 137 is a valid device, the firmware 113 may initiate a boot process to boot the computing device 110. For example, the firmware 113 can verify a boot loader that may load the operating system 119 and/or runtime environment for the computing device 110 (e.g., by verifying a digital signature associated with the boot loader). The firmware 113 may load the boot loader upon verifying the boot loader. The boot loader may load data for the operating system 119 from secondary memory (e.g., from a disk drive or solid state drive) into main memory. The kernel of the operating system may execute before any binary for applications 121A, 121B, 121N in the userspace of the operating system are executed.

In some embodiments, the NFC device 137 may also provide the NFC device 117 with data to be used during the boot process. For example, the NFC device 137 may transmit, to the NFC device 117, a cryptographic key that can be used to access encrypted data to be used to complete the boot process. The cryptographic key can be and/or include, for example, a disk decryption key that can be used to decrypt and/or access encrypted data stored in a storage device of the computing device 110 (e.g., a memory of the computing device 110). In some embodiments, the NFC device 137 may transmit the cryptographic key to the NFC device 117 after the NFC device 117 is successfully authenticated by the NFC device 137. For example, the NFC device 117 can send credential information of the NFC device 117 to the NFC device 137 (e.g., an identifier, signature, password, etc.). Upon receiving the credential information of the NFC device 117, the NFC device 137 can determine whether the received credential information matches credential information of an authenticated NFC device. For example, the NFC device 137 can determine whether an identifier of the NFC device 117 matches an identifier of the authenticated NFC device. As another example, the NFC device 137 can determine whether the credential information of the NFC device 117 is signed by a predetermined entity and/or using a particular key.

As such, the computing device 110 is booted when the computing device 110 is in the predetermined proximity of the NFC device 137 of the valid credential information. The validation process may fail when the computing device 110 and/or the NFC device 117 is not in the predetermined proximity of the NFC device 137. Since the NFC device 137 is positioned at the target location 130 in a way that removing the NFC device 137 from the target location 130 destroys the NFC device 137, the computing device 110 can boot on the condition that the computing device 110 is in the predetermined proximity of the target location 130.

In some embodiments, during the operation of the computing device 110 (e.g., after the completion of the boot process), the NFC device 117 may check the presence of the NFC device 137 periodically or in other continuous manner. In response to determining that the NFC device 137 is not in the predetermined proximity of the NFC device 117, the NFC device 117 may generate a signal indicating the absence of the NFC device 137 and can transmit the signal to the firmware 113. The firmware 113 can then shut down the computing device. As such, the computing device 110 does not operate when the computing device is not within the proximity of the NFC device 137 and/or the target location 130. In some embodiments, the computing device 110 may be rebooted when the NFC device 117 detect the presence of the NFC device 137 again and successfully authenticate the NFC device 137.

In some embodiments, the computing device 110 may also include a secure processor 115 that can secure hardware or other component of the computing device 110 using cryptographic keys. The secure processor 115 can include one or more registers (e.g., one or more platform configuration registers (PCRs) as described in connection with FIG. 2) to store data when the computing device validates the integrity of components of the computing device (e.g., hardware components, software components, etc.). For example, when the computing device validates the signature of a component, the secure processor may extend a platform configuration register with a value (e.g., a hash value that is based on the binary of the component) by performing one or more extent operations. A binary hereinafter refers to a type of binary file that contains machine code for a component, which the computing device 110 can execute. Performing an extend operation on a first value may include concatenating the first value with a second value (e.g., the value to be extended), creating a message including the concatenated values and hashing the resulting message to create a new hash (e.g., a hash of the concatenated values), and replacing the first value with the new hash.

As described above, the firmware 113 may receive the credential information of the NFC device 137 and may authenticate the NFC device 137 using the credential information. The firmware 113 may also provide the credential information to the secure processor 115. In some embodiments, the secure processor 115 can extend a platform configuration register with a value associated with the credential information (e.g., a hash value generated using the credential information). In some embodiments in which the firmware 113 retrieves the cryptographic key from the NFC device 137, the firmware 113 may also provide the cryptographic key to the secure processor 115. The secure processor 115 may determine whether one or more PCRs are in a given state (e.g., by determining whether a value of a PCR is equal to a predetermined value). The secure processor 115 may release the cryptographic key to the boot loader for decrypting the storage device using the cryptographic key and/or for booting the computing device 110. In some embodiments, the secure processor 115 does not release the cryptographic key in response to determining that the PCRs are not in the given state.

In some embodiments, the secure processor 115 may be and/or include a trusted platform module 220 as described in connection with FIG. 2 below.

Figure 2:
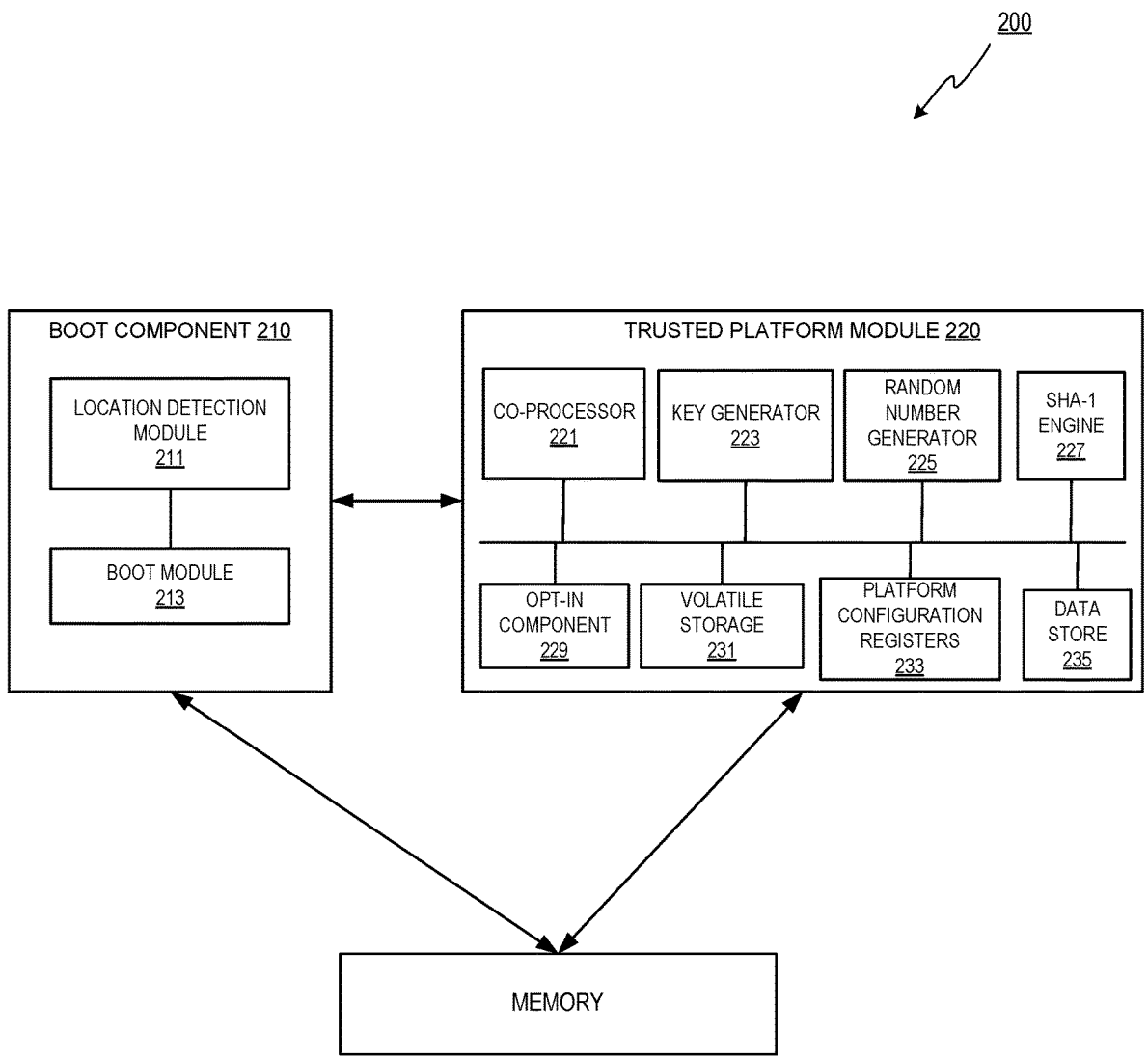
FIG. 2 is a block diagram of a detailed view of a computing device implementing a boot component and a trusted platform module according to an implementation of the disclosure.

FIG. 2 depicts a block diagram illustrating an example 200 of a computer system in accordance with some implementations of the disclosure. As illustrated, the computer system may include a boot component 210 and a trusted platform module (TPM) 220. The boot component 210 may be implemented using the firmware 113 of FIG. 1. The boot component may include a location detection module 211, a boot module 213, and/or any other suitable component for booting and/or operating a computing device in accordance with the present disclosure. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The trusted platform module 220 can extend the value of a platform configuration register 233 with a certain value. In one implementation, the trusted platform module 220 may include components specified by the Trusted Computing Group ("TCG") specification. The trusted platform module 220 can be implemented in software and/or hardware compatible with a trusted platform module specification set forth, for example, by the TCG standard body. The components can include, for example, a cryptographic co-processor 221, a key generator 223, a random number generator 225, a SHA-1 engine 227, an opt-in component 229, a volatile storage 231, platform configuration registers 233, a data store 235, etc. In some embodiments, the functionality of one or more of the components of the trusted platform module 220 can be combined or divided.

The cryptographic co-processor 221 can perform cryptographic operations within the trusted platform module 220. The key generator 223 can create symmetric keys and RSA (Rivest-Shamir-Adleman) asymmetric cryptographic key pairs. The random number generator 225 can provide randomness for the computation of various values such as keys or other values. The opt-in component 229 can maintain the state of persistent and volatile flags and can enforce semantics associated with those flags such that the trusted platform module 220 can be enabled and disabled. The data store 235 can store persistent identity and state information that is associated with the trusted platform module 220. The data store 235 can be non-volatile memory.

The trusted platform module 220 can include one or more platform configuration registers 233. The platform configuration registers (PCRs) 233 can reside in volatile and/or non-volatile memory. In some embodiments, a subset of the set of platform configuration registers 233 can be designated for hardware components and another subset of the set of platform configuration registers 233 can be designated for software components. For example, a first PCR, a second PCR, and a third PCR may be used for the motherboard manufacturer, the processor, the firmware, respectively. As another example, one or more of the PCRs (e.g., lower-numbered PCRs) may be used to represent a boot process of the computing device. One or more of the PCRs (e.g., higher-numbered PCRs) may represent events after the kernel has booted. As a further example, one or more of the PCRs may be reserved for trusted platform module use and one or more of the PCRs are available for operating system and application use.

The trusted platform module 220 may initialize the PCRs at power on (e.g., by setting values of the PCRs to all zeros or all ones). A value of a PCR may be changed through an extend operation. Performing an extend operation on a first value may include concatenating the first value with a second value (e.g., the value to be extended), creating a message A||B and hashing the resulting message to create a new hash (e.g., hash (A||B)), and replacing the first value with the new hash.

The values of the platform configuration registers 233 can be temporal and can be reset at computing system reboot. In one embodiment, the values that are stored in one of the platform configuration registers 233 are "extendable," in that the value for a particular platform configuration register is based on an aggregate of data. For example, the current value that is stored in one the platform configuration registers 233 (e.g., a first PCR) may be changed by hashing the current value in the platform configuration register 233 (e.g., the first PCR) with a new value to result in the "extended value" for the platform configuration registers 233 (e.g., the first PCR). In one implementation, the current value in a platform configuration register 233 is changed, for example, by a component (e.g., firmware, boot loader, kernel, application, etc.) sending an "extend" operation to the trusted platform module 220.

When a platform configuration register 224 is to be updated, the SHA-1 (Secure Hash Algorithm 1) engine 208 can implement the SHA-1 hash algorithm to calculate the new value for the platform configuration register 224 by hashing the current value in the platform configuration register 224 with a given value. For example, the current value that is stored in a given PCR may be changed by the SHA-1 engine 208 hashing the current value in the given PCR with a new value (e.g., public key) to result in the "extended value" for the given PCR.

In some embodiments, the location detection module 211 can determine whether a computing device is within a predetermined proximity of a target location at which the computing device is designated to operate. For example, the location detection module 211 can determine whether a first NFC device associated with the computing device is in the predetermined proximity of a second NFC device positioned at the target location. In some embodiments, the location detection module 211 can acquire credential information of the second NFC device and can authenticate the second NFC device using the credential information. In response to determining that the first NFC device is in the predetermined proximity of the second NFC device and authenticating the second NFC device, the location detection module 211 can determine that the computing device is within a predetermined proximity of the target location.

The boot module 213 can perform a boot process to boot the computing device in view of the determination that the computing device is within the predetermined proximity of the target location. For example, the boot module 213 can retrieve a cryptographic key from the second NFC device and can boot the computing device using the cryptographic key. The cryptographic key may be retrieved via a communication link between the first NFC device and the second NFC device in some embodiments.

In some embodiments, the boot module 213 may determine, using the trusted platform module 220, whether a predetermined policy is satisfied. The policy may be, for example, that a platform configuration register 233 is in a predetermined state (e.g., that a value of the platform configuration register 233 is equal to a predetermined value). In some embodiments, in response to determining that the platform configuration register 233 is in the predetermined state, the boot module 213 and/or the trusted platform module 220 can determine that the predetermined policy is satisfied. The trusted platform module 220 can then release the cryptographic key retrieved from the second NFC device. For example, the trusted platform module 220 can provide the cryptographic key to a firmware, a boot loader, an operating system, an application, etc. of the computing device to boot and/or operate the computing device.

Figure 3:
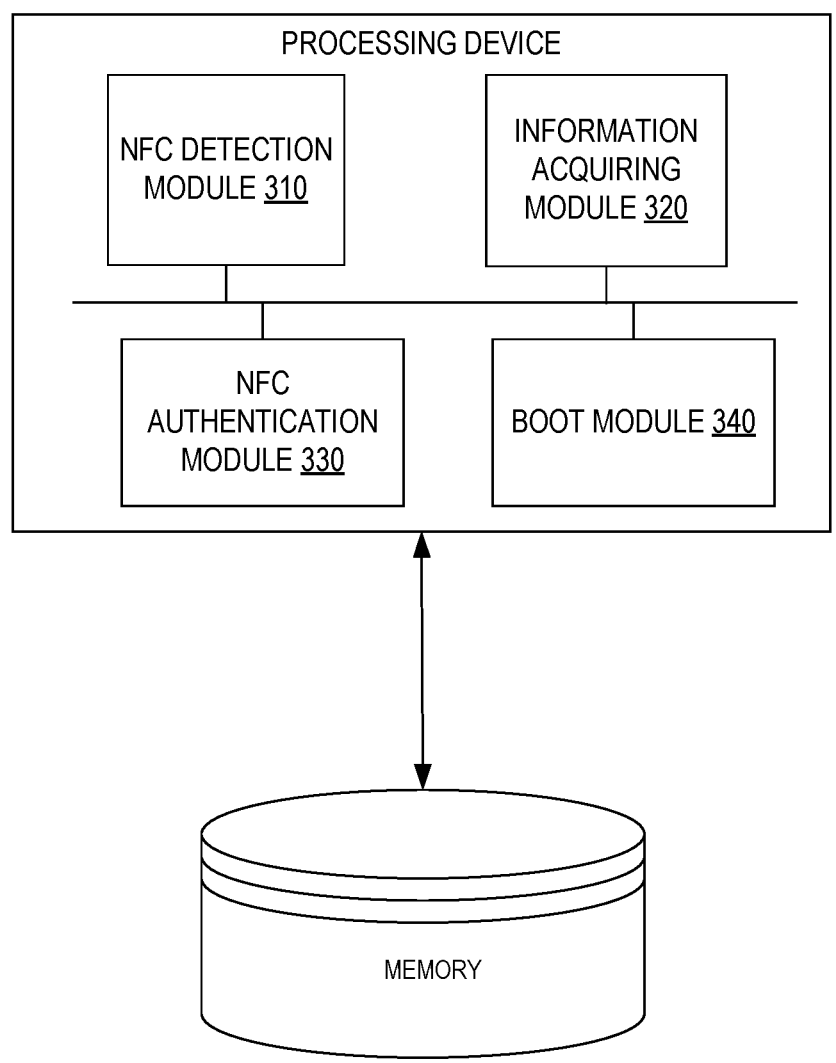
FIGS. 3, 4, and 5 depict block diagrams of example computer systems operating in accordance with one or more aspects of the present disclosure.
Figure 4:
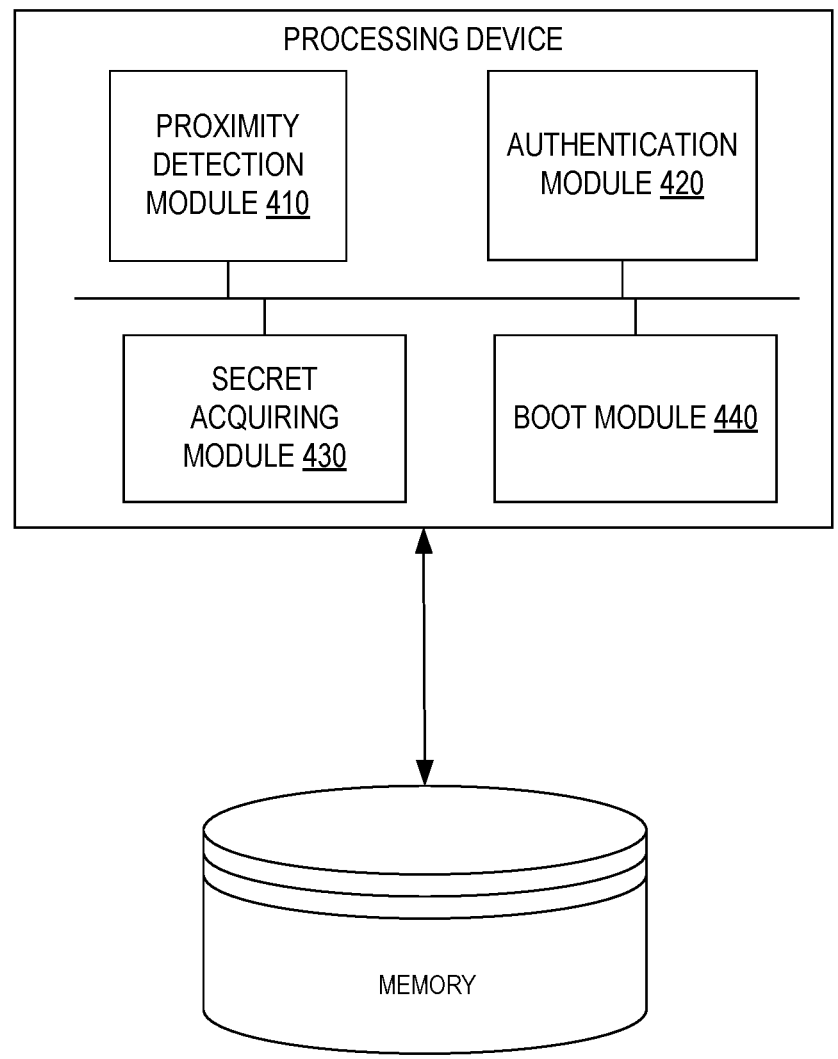
Figure 5:
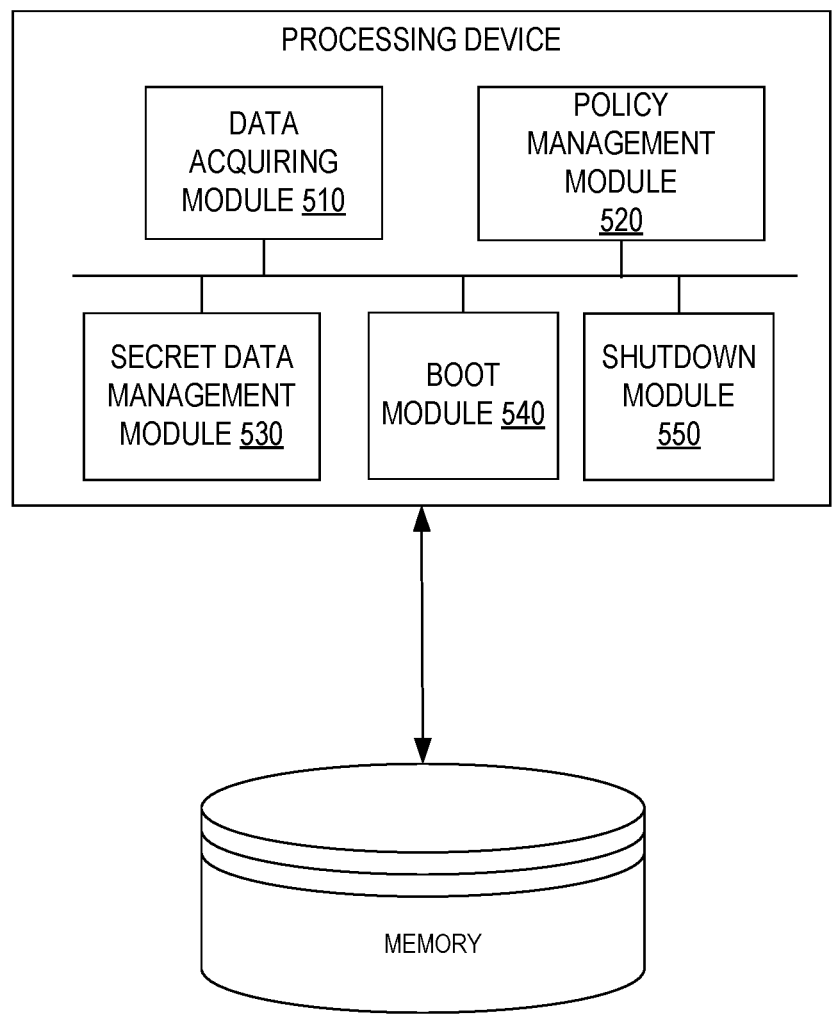

FIGS. 3, 4, and 5 depict block diagrams of example computer systems operating in accordance with one or more aspects of the present disclosure. Each of computer systems 300, 400, and 500 may be the same or similar to computer system 100 and may include one or more processing devices and one or more memory devices. Each of computer systems 300, 400, and 500 may further include a memory storing data in accordance with the present disclosure.

Referring to FIG. 3, computer system 300 may include an NFC detection module 310, an information acquiring module 320, an NFC authentication module 330, and a boot module 340. The NFC detection module 310 may check presence of nearby NFC devices. For example, the NFC detection module 310 may initiate a handshaking process to detect NFC devices in a predetermined proximity of a first NFC device. In some embodiments, the NFC detection module 310 can detect a second NFC device in the predetermine proximity of the first NFC device. The second NFC device may be positioned at a target location where a computing device associated with the first NFC device is designated to operate. The NFC detection module 310 can generate a first signal indicative of the presence of the second NFC device and may transmit the first signal to one or more other components of computer system 300.

In some embodiments, the NFC detection module 310 can check presence of the second NFC device periodically, at random times, or in any other continuous manner. For example, the NFC detection module 310 can check the presence of the second NFC device periodically after the computing device is booted. In response to determining that the first NFC device is not in the predetermined proximity of the second NFC device, the NFC detection module 310 can generate a second signal indicating absence of the second NFC device and may transmit the second signal to one or more other components of computer system 300.

The information acquiring module 320 can acquire information from the detected second NFC device. For example, the information acquiring module 320 can acquire credential information of the second NFC device. As another example, the information acquiring module 320 can acquire data that can be used to boot the computing device, such as one or more cryptographic keys.

The NFC authentication module 330 may perform a validation process to authenticate the second NFC device. In some embodiments, the validation process may be initiated in view of the detection of the presence of the second NFC device (e.g., upon receipt of the first signal indicative of the presence of the second NFC device). In some embodiments, the NFC authentication module 330 may determine that the second NFC device is a valid NFC device in response to determining that the credential information of the second NFC device matches credential information of an authenticated NFC device. Alternatively, the NFC authentication module 330 may determine that the second NFC device is not a valid NFC device in response to determining that the credential information of the second NFC device does not match credential information of an authenticated NFC device. In some embodiments, the NFC authentication module 330 may generate a signal indicating the result of the validation process. More particularly, for example, the signal may indicate that the second NFC device is a valid device or that the second NFC device is not a valid device.

The boot module 340 may boot the computing device associated with the first NFC device. In some embodiments, the boot module 340 may initiate a boot process to boot the computing device in response to determining that the second NFC device is a valid device (e.g., upon receiving the signal indicative of the result of the validation process).

Referring to FIG. 4, computer system 400 may include a proximity detection module 410, an authentication module 420, a secret acquiring module 430, and a boot module 440.

The proximity detection module 410 can determine whether a computing device is in a predetermined proximity of a target location. For example, the proximity detection module 410 can determine that the computing device is in the predetermined proximity of the target location in response to detecting, via a first NFC device of the computing device, presence of a second NFC device positioned at the target location.

The authentication module 420 can perform a validation process to authenticate the computing device with the NFC device positioned at the target location. For example, the authentication module 420 can send credential information of the first NFC device and/or the computing device (e.g., an identifier, a digital signature, a password, etc.) to the second NFC device. The authentication module 420 may receive, from the second NFC device, a signal indicative of whether the second NFC device has authenticated the computing device and/or the first NFC device (e.g., a signal indicating whether the credential information of the first NFC device and/or the computing device is valid). The authentication module 420 may provide the signal to one or more other components of the computer system 400 to indicate the result of the validation process.

The secret acquiring module 430 may acquire secret data that can be used to boot and/or to operate the computing device. For example, the secret acquiring module 430 may acquire one or more cryptographic keys to be used to boot and/or to operate the computing device. The cryptographic keys may include, for example, a decryption key that can be used to decrypt a storage device of the computing device.

The boot module 440 can boot the computing device using the secret data acquired by the secret acquiring module 430. For example, the boot module 440 can decrypt contents of the storage device of the computing device using the cryptographic key and can boot the computing device using the contents of the storage device. As another example, the boot module 440 can decrypt the storage device to load a boot loader, an operating system, etc. to the storage device. The boot process may be performed using a firmware of the computing device in some embodiments.

Referring to FIG. 5, computer system 500 may include a data acquiring module 510, a policy management module 520, a secret data management module 530, a boot module 540, and a shutdown module 550.

The data acquiring module 510 can acquire secret data that can be used to boot and/or to operate the computing device. For example, the data acquiring module 510 may acquire one or more cryptographic keys to be used to boot and/or to operate the computing device. The cryptographic keys may include, for example, a decryption key that can be used to decrypt a storage device of the computing device.

The policy management module 520 can determine whether a predetermined policy is satisfied. The predetermined policy may be any restrict on releasing of the cryptographic key. For example, the predetermined policy may be that one or more PCRs of the trusted platform module are in a predetermined state. A PCR may be regarded as being in the predetermined state when a value of the PCR is equal to a predetermined value corresponding to the predetermined state. In some embodiments, the determination may be made using the trusted platform module. The policy management module 520 can generate a signal indicative of whether the policy is satisfied and can provide the signal to one or more other components of the computer system 500.

The secret data management module 530 can manage cryptographic keys and other secret data for the computer system. For example, the secret data management module 530 can release a cryptographic key in view of a determination that the policy is satisfied. The cryptographic key may be a decryption key that can be used to decrypt a storage device of the computing device (e.g., a hard disk). As another example, the secret data management module 530 can refrain from release the cryptographic key. As such, the storage device of the computing device is not accessible to any component of the computing system.

In some embodiments, the boot module 540 can boot a computing device associated with the first NFC device using the released cryptographic key. For example, the boot module 540 can access the encrypted storage device using the cryptographic keys and can boot the computing device using the contents of the encrypted storage device.

The shutdown module 550 can shut down the computing device in view of a determination that the policy is not satisfied. In some embodiments, the shutdown module 550 can shut down the computing device in view of a determination that the computing device is in a predetermined proximity of a target location (e.g., a determination that the first NFC device is not in the predetermined proximity of the second NFC device). In some embodiments, the shutdown module 550 can shut down the computing device by issue a shutdown command to be executed by an operating system of the computing device. The shutdown command may be executed by the operating system to shut down, restart, log off, etc. the computing device.

Figure 6:
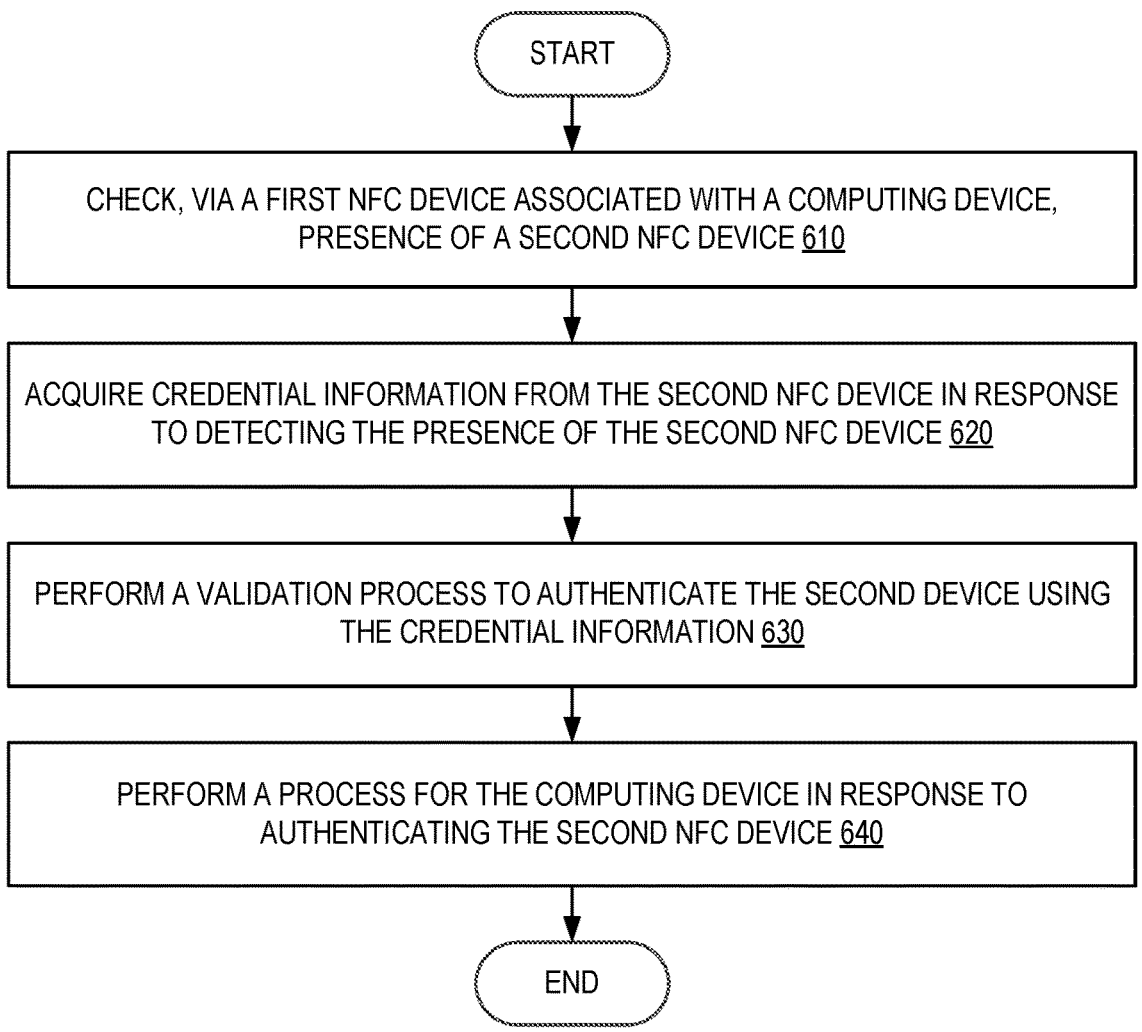
FIG. 6 is a flow diagram illustrating a method for booting a computing device using a near-field communication device in accordance with some embodiments of the present disclosure.
Figure 7:
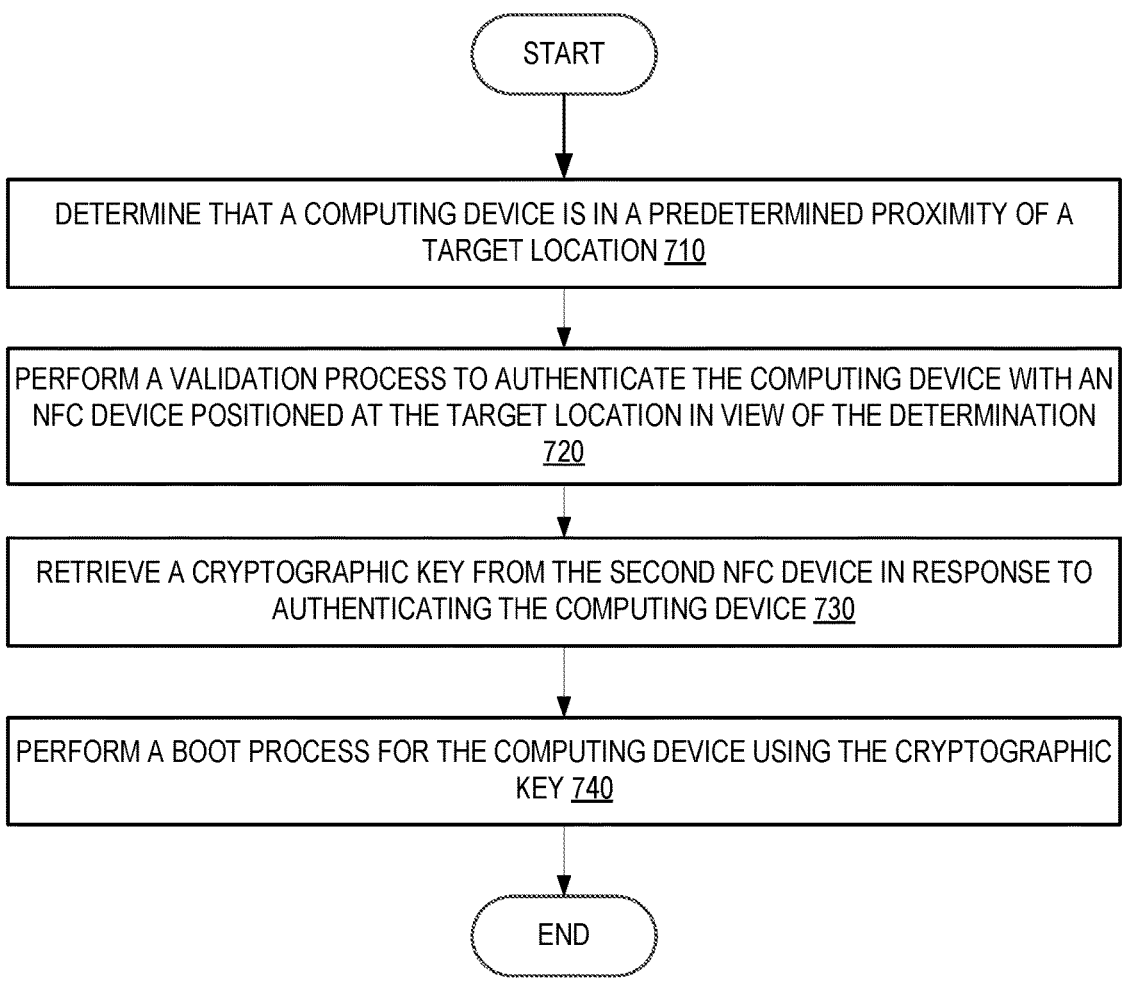
FIG. 7 is a flow diagram illustrating a method for booting a computing device at a target location in accordance with some embodiments of the present disclosure.
Figure 8:
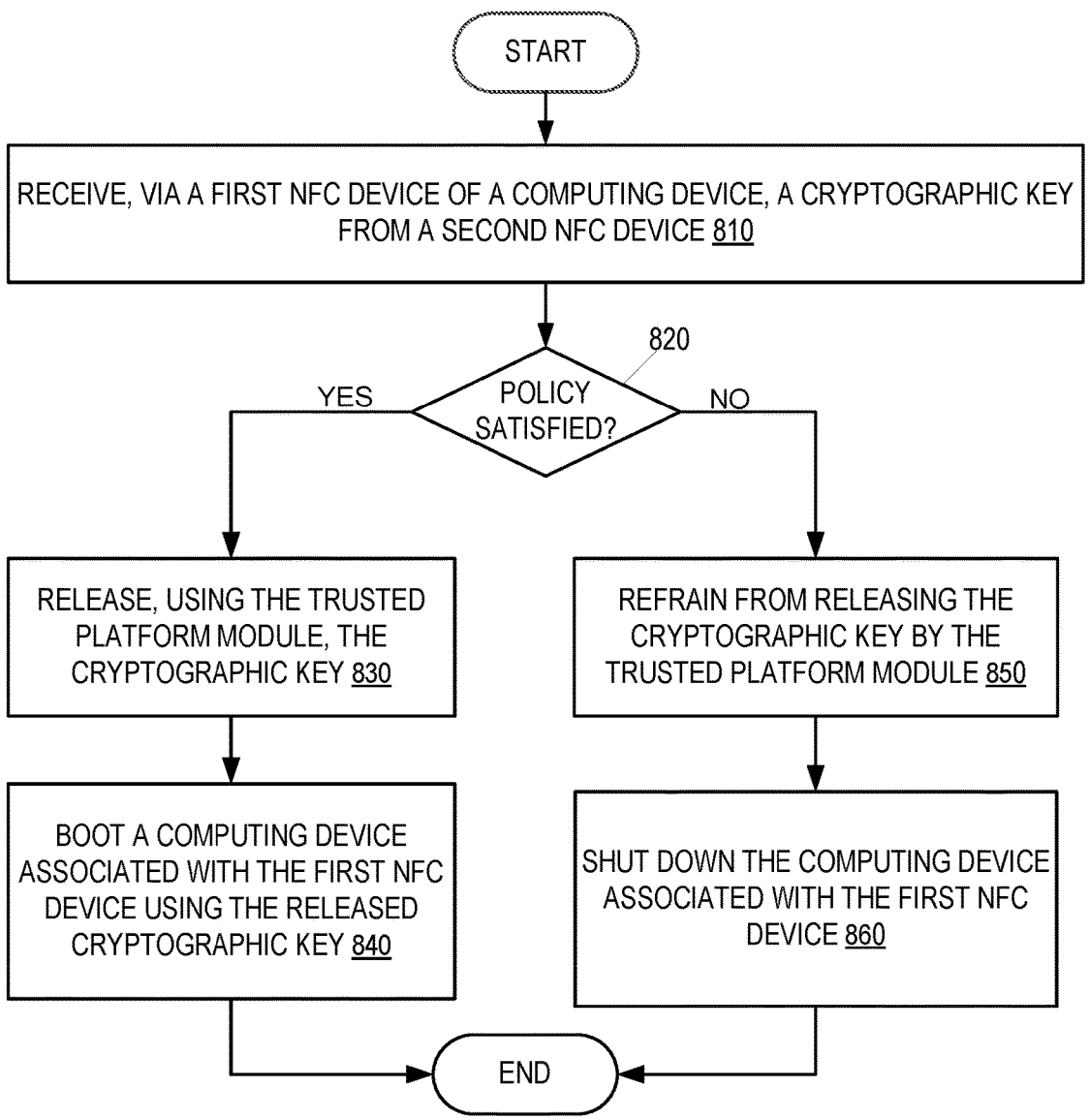
FIG. 8 is a flow diagram illustrating a method for performing a boot process in accordance with some embodiments of the present disclosure.

FIGS. 6, 7, and 8 are flow diagrams illustrating methods 600, 700, and 800 for memory management in a virtualized computer system in accordance with one or more aspects of the present disclosure. Method 600 illustrates an example process for performing a process for a computing device using an NFC device in accordance with some embodiments of the present disclosure. Method 700 illustrates an example process for booting a computing device at a target location in accordance with some embodiments of the present disclosure. Method 800 illustrates an example process for performing a boot process for a computing device in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computing device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Refereeing to FIG. 6, method 600 begins at block 610 where the processing device may check, using a first NFC device associated with a computing device, presence of a second NFC device. For example, the processing device can determine, using the first NFC device, that the second NFC device is in a predetermined proximity of the first NFC device. The processing device may further compare an identifier of the second NFC device with an identifier of an authenticated NFC device (e.g., a stored identifier). The processing device may detect the presence of the second NFC device in response to determining that the second NFC device is in the predetermined proximity of the first NFC device and that the identifier of the second NFC device matches the identifier of the authenticated NFC device. In some embodiments, the processing device can check the presence of the second NFC device by performing a handshaking process via the first NFC device.

At block 620, the processing device may acquire credential information from the second NFC device in response to detecting the presence of the second NFC device. The credential information may be received via a communication link between the first NFC device and the second NFC device. The credential information may include any suitable information that may be used to authenticate the second NFC device. For example, the credential information may include a unique identifier, a password, etc.

At block 630, the processing device may perform a validation process to authenticate the second device using the credential information. For example, the processing device may perform the validation process by comparing the credential information with known credential information of the authenticated NFC device. In some embodiments, the processing device may determine that the second NFC device in response to determining that the credential information matches the known credential information of the authenticated NFC device.

At block 640, the processing device can perform a process for the computing device in response to authenticating the second NFC device. The process may be, for example, a boot process that can boot the computing devices. In some embodiments in which the processing device determines that the second NFC device is not a valid NFC device (e.g., the second NFC device failing the validation process), the processing device can refrain from booting the computing device and/or can shutting down the computing device. In some embodiments, performing the boot process may include performing one or more operations described in connection with FIG. 8. In some embodiments, the process may be a validation process that authenticates the computing device, and/or any other suitable process.

Referring to FIG. 7, method 700 can start when a processing device may determine that a computing device is in a predetermined proximity of a target location. For example, the processing device can detect, via a first NFC device of the computing device, presence of a second NFC device positioned at the target location. In some embodiments, the processing device can perform one or more operations as described in connection with block 610 to detect the presence of the second NFC device. The target location may be a location at which the computing device is designated to operate. That is, the computing device is not to operate if the computing device is not within the predetermined proximity of the target location.

At block 720, the processing device can perform a validation process to authenticate the computing device with an NFC device positioned at the target location (e.g., the second NFC device) in view of the determination that the computing device is in the predetermined proximity of the target location. For example, the processing device can send credential information of the first NFC device and/or the computing device (e.g., an identifier, a digital signature, a password, etc.) to the second NFC device. The second NFC device can then authenticate the computing device and/or the first NFC device by determining whether the credential information is valid. For example, the second NFC device can determine that the credential information is valid in response to determining whether the credential information matches known credential information of an authenticated computing device and/or an authenticated NFC device.

At block 730, the processing device can retrieve a cryptographic key from the NFC device positioned at the target location in response to authenticating the computing device with the NFC device. In some embodiments, the processing device can receive the cryptographic key via the first NFC device (e.g., via a communication link between the first NFC device and the second NFC device). The cryptographic key may be, for example, a decryption key that can be used to decrypt a storage device of the computing device (e.g., a persistent storage such as a hard disk).

At block 740, the processing device can perform a boot process for the computing device using the cryptographic key. For example, the processing device can decrypt contents of the storage device of the computing device using the cryptographic key and can boot the computing device using the contents of the storage device. As another example, the processing device can decrypt the storage device using the cryptographic key to load a boot loader, an operating system, one or more applications, etc. to the storage device. The boot process may be performed using a firmware of the computing device in some embodiments.

Referring to FIG. 8, method 800 can start at block 810 where a processing device can receive, via a first NFC device of a computing device, a cryptographic key from a second NFC device. The first NFC device may be in a predetermined proximity of the second NFC device. The second NFC device may be positioned in a target location where a computing device associated with the first NFC device is designated to operate. The cryptographic key may be, for example, a decryption key that can be used to decrypt an encrypted storage device associated with the computing device (e.g., a persistent storage of the computing device such as a hard disk). Access to the encrypted storage device may be necessary for booting the computing device.

At block 820, the processing device can determine whether a predetermined policy is satisfied. The predetermined policy may be any restrict on releasing of the cryptographic key. For example, the predetermined policy may be that one or more PCRs of a trusted platform module of the computing device are in a predetermined state. A PCR may be regarded as being in the predetermined state when a value of the PCR is equal to a predetermined value corresponding to the predetermined state. In some embodiments, the determination as to the satisfaction of the policy may be made using the trusted platform module.

In some embodiments, the processing device can proceed to block 830 in response to determining that the policy is satisfied (e.g., determining that the value of the PCR is equal to the predetermined value). At block 830, the processing device can release the cryptographic key using the trusted platform module. For example, the trusted platform module can provide the cryptographic key to a firmware, a boot loader, an operating system, etc.

At block 840, the processing device can boot the computing device using the released cryptographic key. For example, the processing device can access the encrypted storage device using the cryptographic keys and can boot the computing device using the contents of the encrypted storage device.

In some embodiments, the processing device can proceed to block 850 in response to determining that the policy is not satisfied (e.g., determining that the one or more PCRs are not in the predetermined state). At block 850, the processing device can refrain from releasing the cryptographic key by the trusted platform module. As such, the boot loader, the operating system, and/or other component of the computing device do not have access to the encrypted storage device. In some embodiments, the processing device can also shut down the computing device associated with the first NFC device at block 860.

Figure 9:
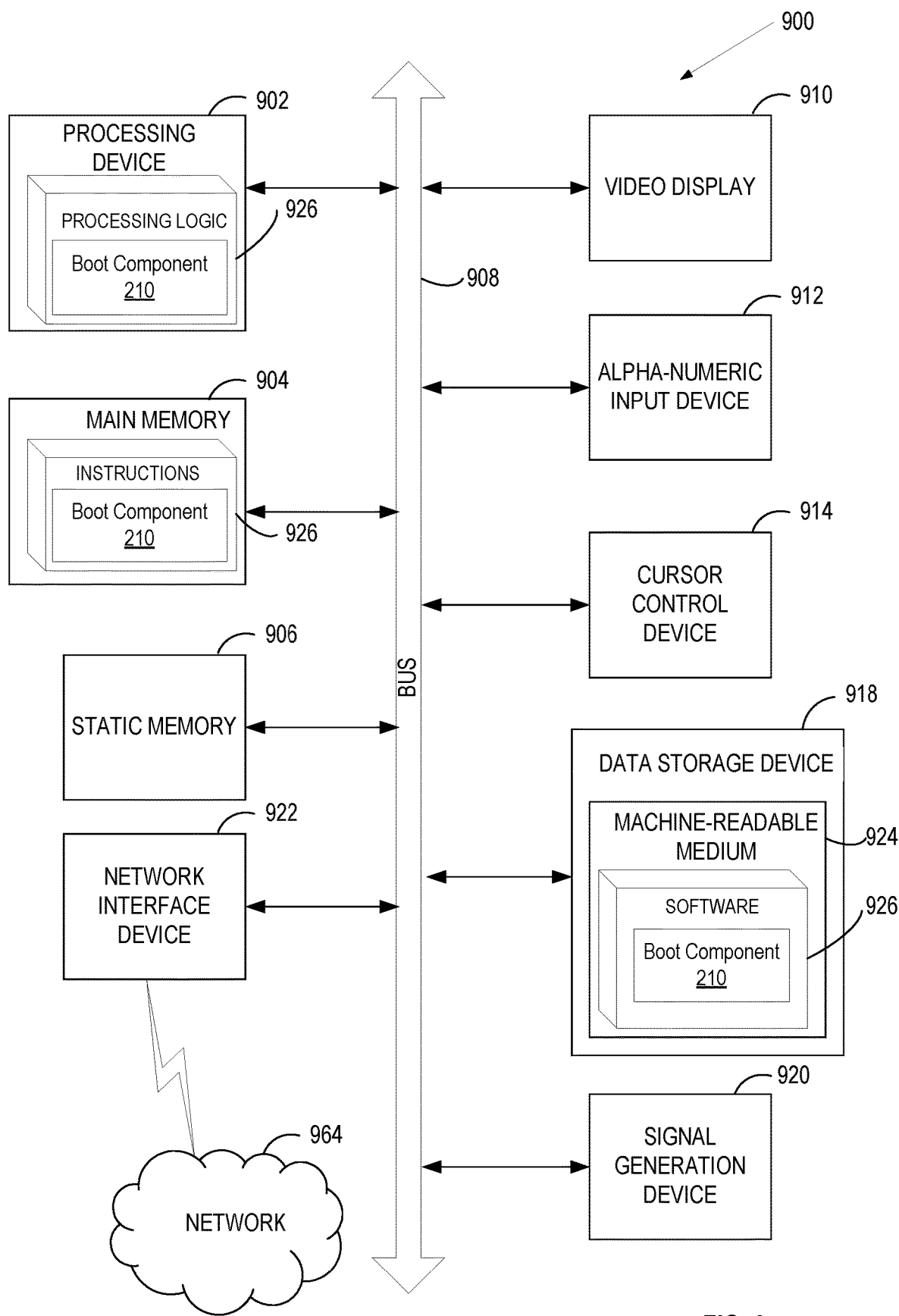
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-accessible storage medium 924 may also be used to store instructions 926 to booting and operating computing devices at target locations, such as the boot component 210 as described with respect to FIG. 2, and/or a software library containing methods that call the above applications. While the machine-readable storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: checking, using a first near-field communication (NFC) device associated with a computing device, presence of a second NFC device; in response to detecting the presence of the second NFC device, acquiring credential information from the second NFC device; performing a validation process to authenticate the second NFC device using the credential information; and performing a process for the computing device in response to authenticating the second NFC device.

Example 2 includes the subject matter of example 1, wherein the process comprises a boot process.

Example 3 includes the subject matter of example 1, wherein detecting the presence of the second NFC device comprises determining that the second NFC device is in a predetermined proximity of the first NFC device.

Example 4 includes the subject matter of example 3, wherein detecting the presence of the second NFC device further comprises determining that an identifier of the second NFC device matches an identifier of an authenticated device positioned at a target location.

Example 5 includes the subject matter of example 3, wherein detecting the presence of the second NFC device further comprises performing a handshaking process via the first NFC device.

Example 6 includes the subject matter of example 1, wherein performing the validation process comprises comparing the credential information with known credential information of an authenticated NFC device positioned at a target location.

Example 7 includes the subject matter of example 1, further comprising performing the validation process using a firmware of the computing device.

Example 8 includes the subject matter of example 1, further comprising: in response to failing to authenticate the second NFC device, shutting down the computing device.

Example 9 includes the subject matter of example 1, further comprising: checking the presence of the second NFC device after completion of the boot process; and in response to detecting absence of the second NFC device, shutting down the computing device.

Example 10 includes the subject matter of example 1, wherein the credential information comprises an identifier of the second NFC device.

Example 11 includes the subject matter of example 1, further comprising: receiving, from the second NFC device, a cryptographic key; and performing the booting process for the computing device using the cryptographic key.

Example 12 includes a method, comprising: determining that a computing device is in a predetermined proximity of a target location; performing a validation process to authenticate the computing device with a near-field communication (NFC) device positioned at the target location in view of the determination; retrieving a cryptographic key from the NFC device in response to authenticating the computing device with the NFC device; and performing, by a processing device, a boot process for the computing device using the cryptographic key.

Example 13 includes the subject matter of example 12, wherein determining that the computing device is in the predetermined proximity of the target location comprises determining that the NFC device is in the predetermined proximity of computing device.

Example 14 includes the subject matter of example 13, wherein determining that the computing device is in the predetermined proximity of the target location further comprises authenticating the NFC device.

Example 15 includes the subject matter of example 12, wherein performing the boot process for the computing device using the cryptographic key comprises accessing a storage device of the computing device using the cryptographic key.

Example 16 includes the subject matter of example 15, wherein performing the boot process for the computing device using the cryptographic key further comprises decrypting the storage device using the cryptographic key to load an operating system to the storage device.

Example 17 includes the subject matter of example 12, further comprising: checking, by the processing device, presence of the NFC device after completion of the boot process; and in response to detecting absence of the NFC device, shutting down the computing device.

Example 18 includes the subject matter of example 12, further comprising performing the boot process using a firmware of the computing device.

Example 19 includes the subject matter of example 12, wherein the computing device is designated to operate at the target location.

Example 20 includes a method comprising: receiving, via a first NFC device of a computing device, a cryptographic key from a second NFC device positioned at a target location; determining, using a trusted platform module of the computing device, whether a predetermined policy is satisfied; in response to determining that the predetermined policy is satisfied, releasing, using the trusted platform module, the cryptographic key; and booting the computing device using the released cryptographic key.

Example 21 includes the subject matter of example 20, wherein releasing the cryptographic key comprises providing the cryptographic key to a boot loader of the computing device.

Example 22 includes the subject matter of example 20, wherein the first NFC device is in a predetermined proximity of the second NFC device, and wherein the computing device is to be installed at the target location.

Example 23 includes the subject matter of example 22, further comprising shutting down the computing device in response to determining that the first NFC device is not in the predetermined proximity of the second NFC device.

Example 24 includes the subject matter of example 20, wherein determining whether the predetermined policy is satisfied comprises determining whether a platform configuration register of the trusted platform module is in a predetermined state.

Example 25 includes the subject matter of example 20, further comprising: in response to determining that the predetermined policy is not satisfied, refraining from releasing the cryptographic key by the trusted platform module.

Example 26 includes the subject matter of example 25, further comprising shutting down the computing device in response to determining that the predetermined policy is not satisfied.

Example 27 includes the subject matter of example 20, further comprising: updating a value of a platform configuration register of the trusted platform module in view of credential information of the second NFC device; and authenticating the second NFC device in view of the updated value of the platform configuration register.

Example 28 includes the subject matter of example 27, further comprising: receiving the credential information of the second NFC device via the first NFC device.

Example 29 includes a system comprising: a memory; and a processing device operatively coupled to the memory, the processing device to: determine that a computing device is in a predetermined proximity of a target location by checking, using a first near-field communication (NFC) device associated with the computing device, presence of a second NFC device, wherein the computing device is to be installed at the target location; perform a boot process for the computing device in view of the determination.

Example 30 includes the subject matter of example 29, wherein to determine that the computing device is in the predetermined proximity of the target location, the processing device is further to: acquire credential information of the second NFC device; and authenticate the second NFC device using the credential information.

Example 31 includes the subject matter of example 29, wherein, to perform the boot process for the computing device, the processing device is further to retrieve a cryptographic key from the second NFC device.

Example 32 includes the subject matter of example 31, wherein the processing device is further to access a storage device of the computing device using the cryptographic key to perform the boot process.

Example 33 includes the subject matter of example 31, wherein the processing device is further to: determine, using a trusted platform module of the computing device, whether a predetermined policy is satisfied; and in response to determining that the predetermined policy is satisfied, release, using the trusted platform module, the cryptographic key.

Example 34 includes the subject matter of example 29, wherein the processing device is further to: check the presence of the second NFC device after completion of the boot process; and in response to detecting absence of the second NFC device, shut down the computing device.

Example 35 include an apparatus comprising: a processing device; and a means for checking, using a first near-field communication (NFC) device associated with a computing device, presence of a second NFC device; a means for in response to detecting the presence of the second NFC device, acquiring credential information from the second NFC device; a means for performing a validation process to authenticate the second NFC device using the credential information; and a means for performing a boot process for the computing device in response to authenticating the second NFC device.

Example 36 includes the subject matter of example 35, further comprising the subject matter of any of examples 1-34.

Example 37 is a system comprising: a memory; and a processing device operatively coupled to the memory, the processing device to implement the subject matter of any of examples 1-34.

Example 38 is a non-transitory machine-readable storage medium including instructions that, when accessed by a processing device, cause the processing device to implement the subject matter of any of examples 1-35.

Unless specifically stated otherwise, terms such as "receiving," "invoking," "associating," "providing," "storing," "performing," "detecting," "initiating," "obtaining," "generating," "determining," "updating," "modifying," "booting," "validating," "authenticating," "comparing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   determining, at a startup process of a computing device, whether the computing device is present at a designated target location by:
   checking, using a first near-field communication (NFC) device associated with the computing device, presence of a second NFC device positioned at the target location,
   acquiring, from the second NFC device, an identifier of the second NFC device,
   comparing the received identifier of the second NFC device with an identifier of an authenticated NFC device, wherein the identifier of the authenticated NFC device comprises a stored identifier stored in a memory associated with firmware of the computing device, and
   in response to the received identifier matching the stored identifier, authenticating the second NFC device;
   in response to authenticating the second NFC device, acquiring a cryptographic key from the second NFC device;
   decrypting, using the cryptographic key, contents of a storage device of the computing device; and
   performing, using the decrypted contents, a boot process for the computing device in response to determining that the computing device is at the target location.

2. The method of claim 1, further comprising performing a validation process to authenticate the second NFC device using credential information obtained from the second NFC device.

3. The method of claim 1, wherein authenticating the second NFC device further comprises determining that the second NFC device is in a predetermined proximity of the first NFC device.

4. The method of claim 3, wherein authenticating the second NFC device further comprises performing a handshaking process via the first NFC device.

5. The method of claim 2, wherein performing the validation process comprises comparing the credential information with known credential information of an authenticated NFC device positioned at the target location.

6. The method of claim 2, further comprising performing the validation process using the firmware of the computing device.

7. The method of claim 2, further comprising: in response to failing to authenticate the second NFC device, shutting down the computing device.

8. The method of claim 1, further comprising:
   checking the presence of the second NFC device after completion of the boot process; and
   in response to detecting absence of the second NFC device, shutting down the computing device.

9. A system comprising:
   a memory; and
   a processing device operatively coupled to the memory, wherein the processing device is configured to:
   determine, at a startup process of a computing device, whether the computing device is present at a designated target location by:
   checking, using a first near-field communication (NFC) device associated with the computing device, presence of a second NFC device positioned at the target location,
   acquiring, from the second NFC device, an identifier of the second NFC device,
   comparing the received identifier of the second NFC device with an identifier of an authenticated NFC device, wherein the identifier of the authenticated NFC device comprises a stored identifier stored in a memory associated with firmware of the computing device, and
   in response to the received identifier matching the stored identifier, authenticating the second NFC device;

in response to authenticating the second NFC device, acquire a cryptographic key from the second NFC device;

decrypt, using the cryptographic key, contents of a storage device of the computing device; and perform, using the decrypted contents, a boot process for the computing device in response to determining that the computing device is at the target location.

10. The system of claim 9, wherein the processing device is further to perform a validation process to authenticate the second NFC device using credential information obtained from the second NFC device.

11. The system of claim 9, wherein to authenticate the second NFC device, the processing device is to determine that the second NFC device is in a predetermined proximity of the first NFC device.

12. The system of claim 11, wherein to authenticate the second NFC device, the processing device is to perform a handshaking process via the first NFC device.

13. A non-transitory machine-readable storage medium including instructions that, when accessed by a processing device, cause the processing device to:

determine, at a startup process of a computing device, whether the computing device is present at a designated target location by:

checking, using a first near-field communication (NFC) device associated with the computing device, presence of a second NFC device positioned at the target location, acquiring, from the second NFC device, an identifier of the second NFC device, comparing the received identifier of the second NFC device with an identifier of an authenticated NFC device, wherein the identifier of the authenticated NFC device comprises a stored identifier stored in a memory associated with firmware of the computing device, and in response to the received identifier matching the stored identifier, authenticating the second NFC device;

in response to authenticating the second NFC device, acquire a cryptographic key from the second NFC device;

decrypt, using the cryptographic key, contents of a storage device of the computing device; and perform, using the decrypted contents, a boot process for the computing device in response to determining that the computing device is at the target location.

14. The non-transitory machine-readable storage medium of claim 13, wherein the processing device is further to perform a validation process to authenticate the second NFC device using credential information obtained from the second NFC device.

15. The non-transitory machine-readable storage medium of claim 13, wherein to authenticate the second NFC device, the processing device is to determine that the second NFC device is in a predetermined proximity of the first NFC device.

16. The non-transitory machine-readable storage medium of claim 13, wherein to authenticate the second NFC device, the processing device is to perform a handshaking process via the first NFC device.

17. The method of claim 1, wherein:

acquiring the cryptographic key from the second NFC device is in further response to determining whether a predetermined policy is satisfied; and the predetermined policy comprises that a platform configuration register (PCR) of a trusted platform module of the computing device is in a predetermined state.

18. The method of claim 17, wherein the predetermined state comprises a predetermined value of the PCR.

19. The method of claim 8, wherein checking the presence of the second NFC device after completion of the boot process comprises checking the presence of the second NFC device a random amount of time after completion of the boot process.

* * * * *